United States Patent
Peng

(10) Patent No.: US 11,450,932 B2
(45) Date of Patent: Sep. 20, 2022

(54) BATTERY, PREPARATION METHOD THEREOF AND ELECTRIC DEVICE

(71) Applicant: Zhuhai CosMX Battery Co., Ltd., Zhuhai (CN)

(72) Inventor: Ning Peng, Zhuhai (CN)

(73) Assignee: ZHUHAI COSMX BATTERY CO., LTD.

(*) Notice: Subject to any disclaimer, the term of this patent is extended or adjusted under 35 U.S.C. 154(b) by 191 days.

(21) Appl. No.: 17/020,934

(22) Filed: Sep. 15, 2020

(65) Prior Publication Data

US 2021/0399269 A1    Dec. 23, 2021

(30) Foreign Application Priority Data

Jun. 19, 2020 (CN) .......................... 202010568433.2

(51) Int. Cl.
| | |
|---|---|
| *H01M 4/02* | (2006.01) |
| *H01M 50/531* | (2021.01) |
| *B23K 26/22* | (2006.01) |
| *B23K 26/32* | (2014.01) |
| *H01M 4/04* | (2006.01) |
| *B23K 101/36* | (2006.01) |

(52) U.S. Cl.
CPC .......... *H01M 50/531* (2021.01); *B23K 26/22* (2013.01); *B23K 26/32* (2013.01); *H01M 4/04* (2013.01); *B23K 2101/36* (2018.08)

(58) Field of Classification Search
CPC ...................................................... H01M 4/02
See application file for complete search history.

(56) References Cited

U.S. PATENT DOCUMENTS

2018/0126491 A1* 5/2018 Nakagawa ......... B23K 26/0643

FOREIGN PATENT DOCUMENTS

| CN | 203481318 U | 3/2014 |
|---|---|---|
| CN | 108465933 A | 8/2018 |
| CN | 209822770 U | 12/2019 |
| CN | 111162324 A | 5/2020 |
| DE | 102013015710 A1 | 7/2014 |
| JP | 2008027831 A | 2/2008 |
| WO | 2019218888 A1 | 11/2019 |

OTHER PUBLICATIONS

Extended European Search Report in EP Application No. 20196254.5; dated Mar. 31, 2021, 7 pages.
First Office Action in CN Patent Application No. 202010568433.2 dated Mar. 21, 2022.

\* cited by examiner

*Primary Examiner* — Jacob B Marks
(74) *Attorney, Agent, or Firm* — Dilworth IP, LLC

(57) ABSTRACT

The present disclosure provides a battery, a preparation method thereof and an electric device. The battery includes a housing and an accommodated battery cell including electrode sheets and electrode tabs, where the electrode sheet includes a current collector, and the current collector is coated with an active material layer, the current collector includes a coating area coated with the active material layer and an empty foil area not coated with the active material layer, one end of the electrode tab is overlapped with the empty foil area, and the electrode tab and the electrode sheet are formed into an integral structure by laser welding; a surface of the empty foil area facing away from the electrode tab has a plurality of spiral weld marks arranged at intervals; and a surface of the electrode tab facing away from the empty foil area has no weld marks.

17 Claims, 5 Drawing Sheets

BATTERY, PREPARATION METHOD THEREOF AND ELECTRIC DEVICE

CROSS-REFERENCE TO RELATED APPLICATION

This application claims priority to Chinese Patent Application No. 202010568433.2, filed on Jun. 19, 2020, which is hereby incorporated by reference in its entirety.

TECHNICAL FIELD

The present disclosure relates to the field of lithium battery technology and, in particular, to a battery, a preparation method thereof and an electric device.

BACKGROUND

With the development of science and technology, battery-powered devices are becoming more and more common in life; existing batteries include various types such as lead storage batteries and lithium batteries. Among them, the lithium ion batteries are widely used in electric vehicles and mobile terminals due to their advantages such as high energy density and environmental friendliness. For example, most automobile manufacturers have input a lot of money and manpower to improve the endurance and safety performance of lithium ion batteries.

In the existing lithium ion battery, an electrode sheet and an electrode tab are welded by ultrasonic wave. However, unfortunately, the use of ultrasonic welding would form a relatively sharp needle-shaped welding protrusion on a side of the electrode sheet, causing a positive electrode sheet and a negative electrode sheet to be prone to short circuit.

SUMMARY

The present disclosure provides a battery, a preparation method thereof and an electric device, where a battery separator between a positive electrode sheet and a negative electrode sheet is not easy to be pierced by a convex portion formed by laser welding an electrode sheet and an electrode tab of the battery, thereby preventing the occurrence of short circuit.

In a first aspect, the present disclosure provides a battery, including a housing and a battery cell accommodated in the housing; where the battery cell includes electrode sheets and electrode tabs, the electrode sheet includes a current collector, and the current collector is coated with an active material layer, the current collector includes a coating area coated with the active material layer and an empty foil area not coated with the active material layer, one end of the electrode tab is overlapped with the empty foil area, and the electrode tab and the electrode sheet are formed into an integral structure by laser welding; a surface of the empty foil area facing away from the electrode tab has a plurality of spiral weld marks arranged at intervals, each of the spiral weld marks includes a spiral concave portion and a spiral convex portion located at an edge of the spiral concave portion; and a surface of the electrode tab facing away from the empty foil area has no weld marks.

The battery according to the present disclosure includes the housing and the battery cell accommodated in the housing, where the battery cell includes the electrode sheets and the electrode tabs, the electrode sheet includes the current collector, and the current collector is coated with the active material layer, the current collector includes the coating area coated with the active material layer and the empty foil area not coated with the active material layer, one end of the electrode tab is overlapped with the empty foil area, and the electrode tab and the empty foil area of the electrode sheet are formed into an integral structure by laser welding. Therefore, on the one hand, it can be avoided that the performance of the battery is affected adversely due to false welding or over welding caused by abrasion of a welding head; on the other hand, the work of replacing the welding head is omitted, and thus the amount of work of workers is reduced. After the laser welding is completed, the surface of the empty foil area of the electrode sheet facing away from the electrode tab will form a plurality of spiral weld marks arranged at intervals, where each of the spiral weld marks includes the spiral concave portion and the spiral convex portion located at the edge of the spiral concave portion. Since the contact area between the spiral convex portion and the battery separator is larger than that between a needle-shaped welding protrusion and a battery separator in the prior art, the pressure between the spiral convex portion and the battery separator is relatively small, and thus the battery separator between the positive electrode sheet and the negative electrode sheet is not easy to be pierced by the spiral convex portion, furthermore, the short circuit between the positive electrode sheet and the negative electrode sheet can be prevented, conducive to improving the safety performance and reliability of the battery. In addition, the surface of the electrode tab facing away from the empty foil area has no weld marks, which means that the surface of the electrode tab facing away from the empty foil area can keep the original flatness of the electrode tab unchanged during the welding process, in this way, the surface of the electrode tab facing away from the empty foil area can be prevented from forming a structure that is not beneficial to the battery separator during the welding process, thereby facilitating improving the quality and reliability of the battery.

With respect to the battery cell as described above, alternatively, the number of turns of the spiral weld mark is greater than 1; a ratio of a distance between two adjacent turns of the spiral weld mark to a height of the spiral convex portion is not less than 3.

With respect to the battery cell as described above, alternatively, the distance between two adjacent turns of the spiral weld mark is 100 μm-500 μm.

With respect to the battery cell as described above, alternatively, the plurality of spiral weld marks are arranged in an array.

With respect to the battery cell as described above, alternatively, a minimum distance between the spiral weld mark and the coating area is greater than 1 mm; and/or, the empty foil area is located in the middle of the electrode sheet.

With respect to the battery cell as described above, alternatively, a height of the spiral convex portion is within 30 μm; a depth of the spiral concave portion is less than a sum of a thickness of the empty foil area and that of the electrode tab.

With respect to the battery cell as described above, alternatively, a depth of the spiral concave portion is 10 μm-80 μm.

With respect to the battery cell as described above, alternatively, a diameter of the spiral weld mark is greater than 200 μm.

In a second aspect, the present disclosure provides a preparation method of battery, including: overlapping one end of an electrode tab with an empty foil area of an electrode sheet; causing a laser welding device to perform continuous welding on a surface of the empty foil area facing away from the electrode tab for several times, where each continuous welding performed by the laser welding device forms a spiral weld mark, and a plurality of the spiral weld marks are arranged at intervals; the spiral weld mark includes a spiral concave portion and a spiral convex portion located at an edge of the spiral concave portion; and where a surface of the electrode tab facing away from the empty foil area has no weld marks;

jointly processing the electrode sheet welded with the electrode tab and a battery separator to form a battery cell; assembling the battery cell into a housing to form a battery.

The preparation method of battery according to the present disclosure fits the empty foil area of the electrode sheet with the electrode tab closely, and causes the laser welding device to perform continuous welding on the surface of the empty foil area facing away from the electrode tab for several times, where each continuous welding performed by the laser welding device forms the spiral weld mark, and a plurality of the spiral weld marks are arranged at intervals. On the one hand, the use of the laser welding can avoid affecting the performance of the battery adversely due to false welding or over welding caused by abrasion of a welding head; on the other hand, the work of replacing the welding head is omitted, and thus the amount of work of workers is reduced. The spiral weld mark formed by laser welding includes the spiral concave portion and the spiral convex portion located at the edge of the spiral concave portion. Since the contact area between the spiral convex portion and the battery separator is larger than that between a needle-shaped welding protrusion and a battery separator in the prior art, the pressure between the spiral convex portion and the battery separator is relatively small, and thus the battery separator between the positive electrode sheet and the negative electrode sheet is not easy to be pierced by the spiral convex portion, furthermore, the short circuit between the positive electrode sheet and the negative electrode sheet can be prevented, conducive to improving the safety performance and reliability of the battery. In addition, the surface of the electrode tab facing away from the empty foil area has no weld marks, which means that the surface of the electrode tab facing away from the empty foil area can keep the original flatness of the electrode tab unchanged during the welding process, in this way, the surface of the electrode tab facing away from the empty foil area can be prevented from forming a structure that is not beneficial to the battery separator during the welding process, thereby facilitating improving the quality and reliability of the battery.

In a third aspect, the present disclosure provides an electric device including the battery as described above.

The electric device according to the present disclosure includes a battery, where the battery includes a housing and a battery cell accommodated in the housing, the battery cell includes electrode sheets and electrode tabs, the electrode sheet includes a current collector, and the current collector is coated with an active material layer, the current collector includes a coating area coated with the active material layer and an empty foil area not coated with the active material layer, one end of the electrode tab is overlapped with the empty foil area, and the electrode tab and the empty foil area of the electrode sheet are formed into an integral structure by laser welding. Therefore, on the one hand, it can be avoided that the performance of the battery is affected adversely due to false welding or over welding caused by abrasion of a welding head; on the other hand, the work of replacing the welding head is omitted, and thus the amount of work of workers is reduced. After the laser welding is completed, the surface of the empty foil area of the electrode sheet facing away from the electrode tab will form a plurality of spiral weld marks arranged at intervals, where each of the spiral weld marks includes the spiral concave portion and the spiral convex portion located at the edge of the spiral concave portion. Since the contact area between the spiral convex portion and the battery separator is larger than that between a needle-shaped welding protrusion and a battery separator in the prior art, the pressure between the spiral convex portion and the battery separator is relatively small, and thus the battery separator between the positive electrode sheet and the negative electrode sheet is not easy to be pierced by the spiral convex portion, furthermore, the short circuit between the positive electrode sheet and the negative electrode sheet can be prevented, conducive to improving the safety performance and reliability of the battery. In addition, the surface of the electrode tab facing away from the empty foil area has no weld marks, which means that the surface of the electrode tab facing away from the empty foil area can keep the original flatness of the electrode tab unchanged during the welding process, in this way, the surface of the electrode tab facing away from the empty foil area can be prevented from forming a structure that is not beneficial to the battery separator during the welding process, thereby facilitating improving the quality and reliability of the battery.

BRIEF DESCRIPTION OF DRAWINGS

In order to illustrate embodiments of the present disclosure or technical solutions in the prior art more explicitly, the following will briefly introduce the drawings required in the description of the embodiments or the prior art. Obviously, the drawings in the following description are some embodiments of the present disclosure. Those of skilled in the art can obtain other drawings based on these drawings without creative works.

DESCRIPTION OF REFERENCE NUMBERS

20—electrode sheet;
21—spiral weld mark;
211—spiral concave portion;
212—spiral convex portion;
30—electrode tab.

DESCRIPTION OF EMBODIMENTS

In the process of welding an electrode tab and an electrode sheet of a battery cell by ultrasonic welding, it is necessary to make a welding head of the ultrasonic welding contact with a surface of the electrode tab facing away from the electrode sheet and perform pressure vibration to weld the electrode tab and the electrode sheet together; in this process, abrasion of the welding head of the ultrasonic welding will occur, and thus it is required to replace the welding head regularly, which increases the amount of work of workers; at the same time, the abrasion of the welding head is easy to result in the problem of false welding or over welding between the electrode tab and the electrode sheet, which affects the performance of the battery adversely.

Figure 1:
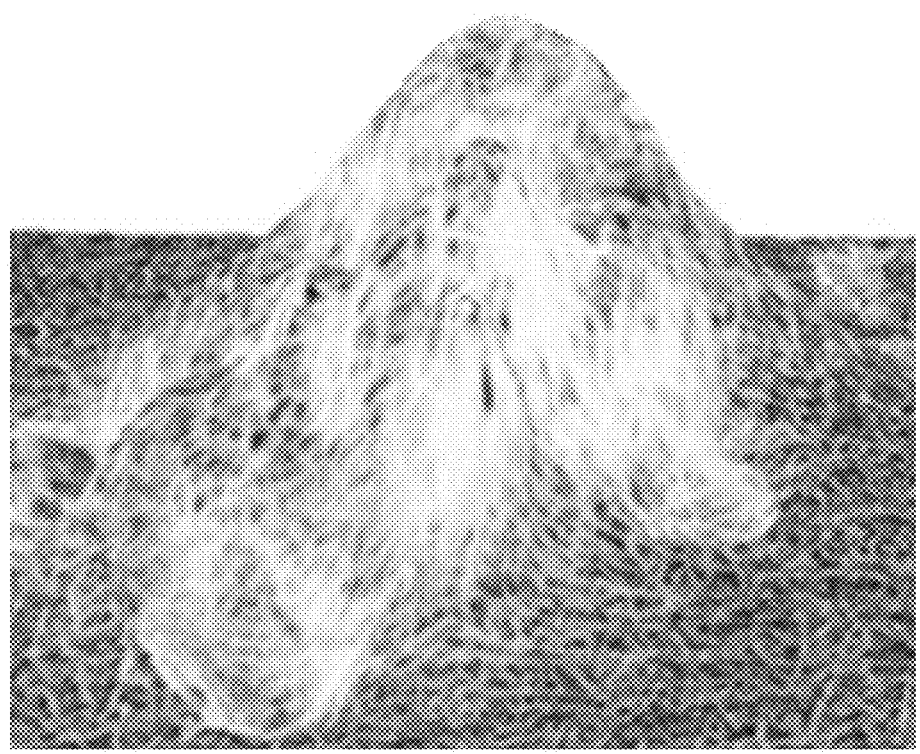
FIG. 1 is a micrograph of a needle-shaped welding protrusion formed on a side of an electrode sheet after ultrasonic welding in the prior art.

Additionally, the ultrasonic welding would form a relatively sharp needle-shaped welding protrusion on a side of the electrode sheet, as shown in FIG. 1. Since the contact area between the needle-shaped welding protrusion and a battery separator between a positive electrode sheet and a negative electrode sheet is only the area at the apex of the needle-shaped welding protrusion, the pressure between the needle-shaped welding protrusion and the battery separator would be relatively large, and thus the battery separator is relatively easy to be pierced by the needle-shaped welding protrusion, which leads to the short circuit between the positive electrode sheet and the negative electrode sheet and then may cause a relatively dangerous situation such as battery explosion.

In order to solve the above technical problems, the present disclosure provides a battery, where an electrode sheet and an electrode tab of the battery are permanently connected by laser welding. The laser welding is a method for welding the electrode sheet and the electrode tab from a side of the electrode sheet by using a laser beam with high energy density as a heat source, where the laser welding does not have the problem of abrasion of the welding head, therefore, there is no problem of false welding or over welding caused by abrasion of the welding head, and there is no problem of increasing amount of work caused by replacing the welding head. At the same time, the contact area between the spiral convex portion formed after the laser welding and the battery separator is an entire spiral top of the spiral convex portion and, apparently, it is larger than the contact area between the needle-shaped welding protrusion and the battery separator in the prior art, thus, the pressure between the spiral convex portion and the battery separator is relatively small, and then the battery separator between the positive electrode sheet and the negative electrode sheet is not easy to be pierced by the spiral convex portion, which avoids the short circuit and thus is conducive to ensuring safety performance and reliability of the battery.

In order to make the objective, technical solutions and advantages of the present disclosure more explicit, the technical solutions in the embodiments of the present disclosure are illustrated clearly and completely in detail in combination with the accompanying drawings in the embodiments of the present disclosure hereinafter. Obviously, the embodiments described are only a part of embodiments of the present disclosure, and are not all of the embodiments thereof. Based on the embodiments of the present disclosure, all the other embodiments obtained by those skilled in the art without creative works are within the protection scope of the present disclosure.

Embodiment I

Figure 2:
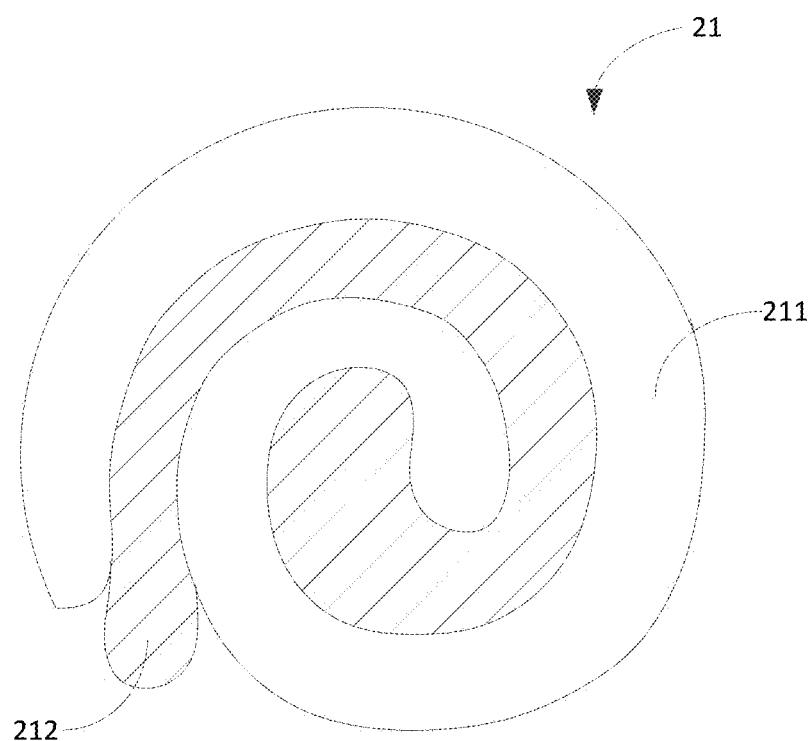
FIG. 2 is a schematic structural diagram of a spiral weld mark formed after welding an electrode sheet and an electrode tab of a battery cell provided by Embodiment I of the present disclosure.
Figure 3:
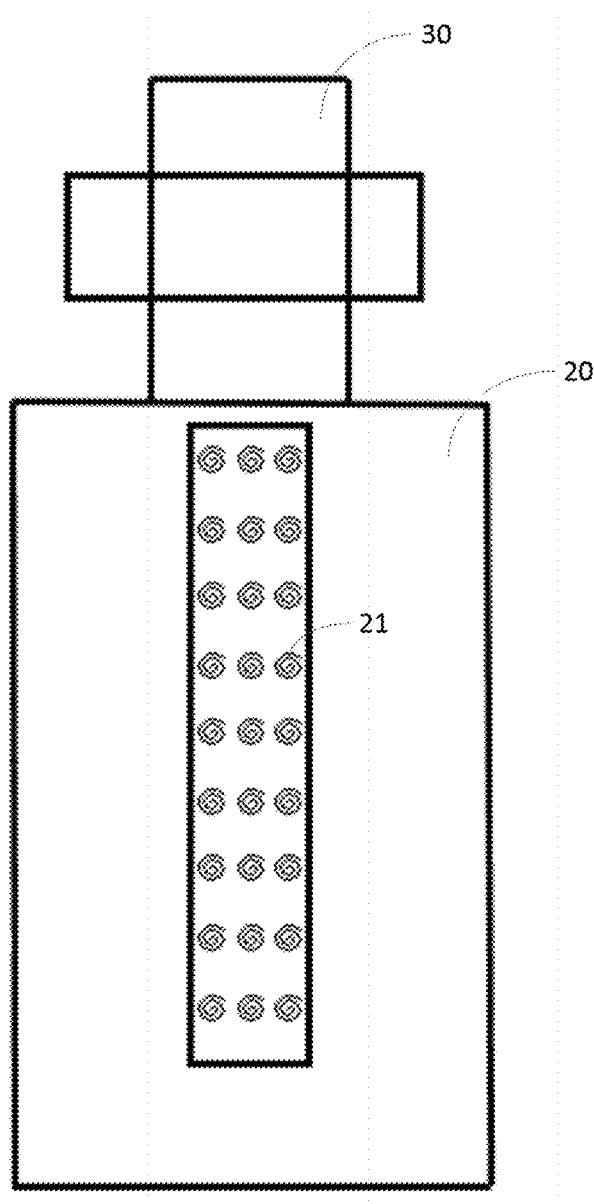
FIG. 3 is a schematic structural diagram of a side of an electrode sheet after welding the electrode sheet and an electrode tab of a battery cell provided by Embodiment I of the present disclosure.
Figure 4:
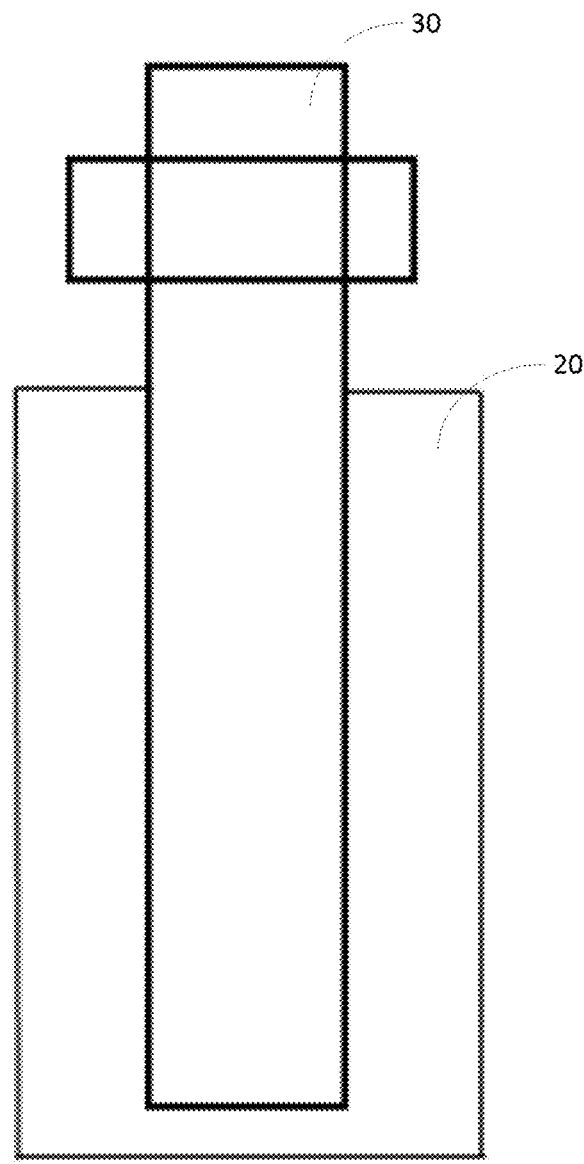
FIG. 4 is a schematic structural diagram of a side of an electrode tab after welding an electrode sheet and an electrode tab of a battery cell provided by Embodiment I of the present disclosure.
Figure 5:
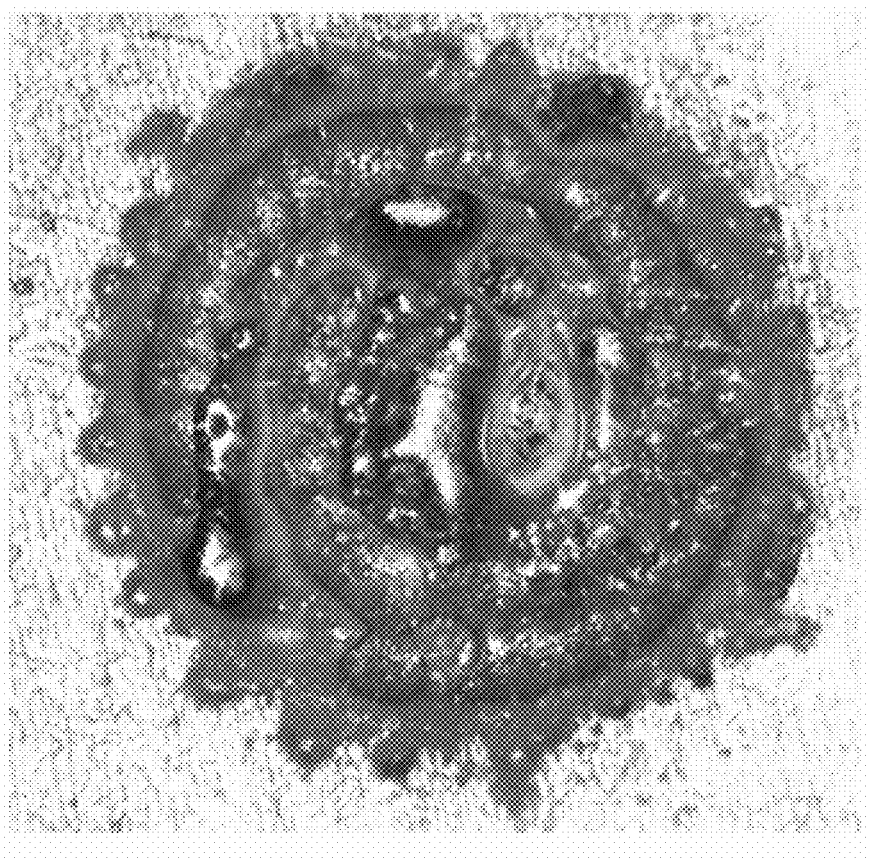
FIG. 5 is a micrograph of a spiral weld mark formed after welding an electrode sheet and an electrode tab of a battery cell provided by Embodiment I of the present disclosure.

FIG. 2 is a schematic structural diagram of a spiral weld mark formed after welding an electrode sheet and an electrode tab of a battery cell provided by Embodiment I of the present disclosure; FIG. 3 is a schematic structural diagram of a side of an electrode sheet after welding an electrode sheet and an electrode tab of a battery cell provided by Embodiment I of the present disclosure; FIG. 4 is a schematic structural diagram of a side of an electrode tab after welding an electrode sheet and an electrode tab of a battery cell provided by Embodiment I of the present disclosure; FIG. 5 is a micrograph of a spiral weld mark formed after welding an electrode sheet and an electrode tab of a battery cell provided by Embodiment I of the present disclosure.

Referring to FIG. 2 to FIG. 5, the present embodiment provides a battery, where the battery includes a housing and a battery cell accommodated in the housing; the battery cell includes electrode sheets 20 and electrode tabs 30, the electrode sheet 20 includes a current collector, and the current collector is coated with an active material layer, the current collector includes a coating area coated with the active material layer and an empty foil area not coated with the active material layer, where one end of the electrode tab 30 is overlapped with the empty foil area, and the electrode tab 30 and the empty foil area of the electrode sheet 20 are formed into an integral structure by laser welding.

The battery cell according to the present embodiment can be a wound-type cell or a laminated cell; the electrode sheet can be a positive electrode sheet or a negative electrode sheet. The electrode sheet includes the current collector, and the active material layer coated on the surface of the current collector. In order to weld the electrode tab and the current collector of the electrode sheet, it is necessary to reserve the empty foil area which is not coated with the active material layer on the surface of the current collector, or remove the active material layer on a part of the surface of the current collector so as to expose the current collector, where the exposed surface of the current collector is the empty foil area, and the area covered by the active material layer on the surface of the current collector is the coating area. Generally, the current collector of the positive electrode sheet is an aluminum foil, and the current collector of the negative electrode sheet is a copper foil.

Specifically, the wound-type cell includes the positive electrode sheet, the negative electrode sheet and the battery separator separating the positive electrode sheet from the negative electrode sheet; a positive electrode tab is welded on the positive electrode sheet, and a negative electrode tab is welded on the negative electrode sheet. In the process of winding, the positive electrode sheet, the battery separator and the negative electrode sheet are winding in the same direction from the beginning of winding and finally form the wound-type cell.

The laminated cell includes the positive electrode sheet, the negative electrode sheet and the battery separator separating the positive electrode sheet from the negative electrode sheet; a positive electrode tab is welded on the positive electrode sheet, and a negative electrode tab is welded on the negative electrode sheet. During processing, the positive electrode sheet and the negative electrode sheet are alternately stacked, at the same time, the battery separator is stacked between two adjacent positive and negative electrode sheets, and finally they are stacked to form the laminated cell.

It should be noted that the laser welding is implemented by welding the electrode tab 30 and the electrode sheet 20 from a side of the electrode sheet 20; after the laser welding is completed, a plurality of spiral weld marks 21 arranged at intervals will be formed on a surface of a welding zone between the empty foil area of the electrode sheet 20 and the electrode tab 30. Specifically, the spiral weld mark 21 includes a spiral concave portion 211 and a spiral convex portion 212 located at the edge of the spiral concave portion 211. In that case, the number of turns of the spiral weld mark 21 can be set to one, two or more based on actual needs, as long as the welding requirements between the electrode sheet 20 and the electrode tab 30 according to the present embodiment can be met.

In the present embodiment, a surface of the electrode tab 30 facing away from the empty foil area has no weld marks. Since the laser welding is implemented by welding from the surface of the empty foil area facing away from the electrode tab 30, the spiral weld mark 21 is formed only on the surface of the empty foil area facing away from the electrode tab 30, while the surface of the electrode tab 30 facing away from the empty foil area retains the original surface of the electrode tab 30. In other words, the original flatness of the surface of the electrode tab 30 facing away from the empty foil area will not be affected by welding, and thus the surface of the electrode tab 30 can be prevented from forming a structure that is not beneficial to the battery separator during the welding process.

In specific implementation, firstly, the empty foil area of the electrode sheet 20 is closely attached to one end of the electrode tab 30, for example, the empty foil area of the electrode sheet 20 can be closely attached to the electrode tab 30 by pressing down a clamping apparatus, or the empty foil area of the electrode sheet 20 can be closely attached to the electrode tab 30 by attracting a clamping apparatus, so as to avoid the situation of burning through the electrode sheet 20 caused by loose attachment. Afterwards, process parameters of a laser welding device are set, so that the laser welding device performs continuous welding to the electrode tab 30 and the electrode sheet 20 on the surface of the empty foil area facing away from the electrode tab for several times, where each continuous welding performed by the laser welding device forms one spiral weld mark 21, and a plurality of the spiral weld marks 21 are arranged on the surface of the empty foil area facing away from the electrode tab 30, at intervals; whereas a surface of the electrode tab 30 facing away from the empty foil area has no weld marks. The spiral weld mark 21 includes the spiral concave portion 211 and the spiral convex portion 212 located at the edge of the spiral concave portion 211. Within the battery cell, the top of the spiral convex portion 212 will be in contact with the battery separator between the positive electrode sheet and the negative electrode sheet. Since the contact area between the spiral convex portion 212 and the battery separator is larger than that between a needle-shaped welding protrusion and a battery separator in the prior art, the pressure between the spiral convex portion 212 and the battery separator is relatively small, and thus the battery separator between the positive electrode sheet and the negative electrode sheet is not easy to be pierced by the spiral convex portion 212.

The battery according to the present embodiment includes the housing and the battery cell accommodated in the housing, where the battery cell includes the electrode sheets 20 and the electrode tabs 30, the electrode sheet 20 includes the current collector, and the current collector is coated with the active material layer, the current collector includes the coating area coated with the active material layer and the empty foil area not coated with the active material layer, one end of the electrode tab 30 is overlapped with the empty foil area, and the electrode tab 30 and the empty foil area of the electrode sheet 20 are formed into an integral structure by laser welding. Therefore, on the one hand, it can be avoided that the performance of the battery is affected adversely due to false welding or over welding caused by abrasion of a welding head; on the other hand, the work of replacing the welding head is omitted, and thus the amount of work of workers is reduced. After the laser welding is completed, the surface of the empty foil area of the electrode sheet 20 facing away from the electrode tab 30 will form a plurality of spiral weld marks 21 arranged at intervals, where each of the spiral weld marks 21 includes the spiral concave portion 211 and the spiral convex portion 212 located at the edge of the spiral concave portion 211. Since the contact area between the spiral convex portion 212 and the battery separator is larger than that between a needle-shaped welding protrusion and a battery separator in the prior art, the pressure between the spiral convex portion 212 and the battery separator is relatively small, and thus the battery separator between the positive electrode sheet and the negative electrode sheet is not easy to be pierced by the spiral convex portion 212, furthermore, the short circuit between the positive electrode sheet and the negative electrode sheet can be prevented, conducive to improving the safety performance and reliability of the battery. In addition, the surface of the electrode tab 30 facing away from the empty foil area has no weld marks, which means that the surface of the electrode tab 30 facing away from the empty foil area can keep the original flatness of the electrode tab 30 unchanged during the welding process, in this way, the surface of the electrode tab 30 facing away from the empty foil area can be prevented from forming a structure that is not beneficial to the battery separator during the welding process, thereby facilitating improving the quality and reliability of the battery.

In order to obtain better welding effects between the electrode sheet 20 and the electrode tab 30, the number of turns of the spiral weld mark 21 can be set to be greater than 1, so that the contact area of a welding part of the electrode sheet 20 and the electrode tab 30 can be increased. On the one hand, it is beneficial to ensure the welding strength between the electrode sheet 20 and the electrode tab 30 and, on the other hand, it is beneficial to improve the efficiency of electric power transmission between the electrode sheet 20 and the electrode tab 30.

And, the ratio of the distance between two adjacent turns of the spiral weld mark 21 to the height of the spiral convex portion 212 is not less than 3. It means that the height of the spiral convex portion 212 is much smaller than the width between two adjacent turns of the spiral weld mark 21. In specific implementation, the height of the spiral convex portion 212 is set to be relatively small, so that the probability that the spiral convex portion 212 pierces the battery separator between the positive electrode sheet and the negative electrode sheet is relatively small, thereby facilitating improving the quality and reliability of the battery. The configuration of a larger distance of two adjacent turns of the spiral weld mark 21 is beneficial to ensure heat dissipation effect during the welding process, so as to avoid oxidative blackening or even perforation of the electrode sheet 20 caused by heat accumulation, which not only affects welding effects between the electrode sheet 20 and the electrode tab 30, but also is not conducive to the quality and the safety performance of the battery.

Furthermore, if the distance between two adjacent turns of the spiral weld mark 21 is too small, the heat dissipation during the welding process will be inferior; if the distance between two adjacent turns of the spiral weld mark 21 is too large, it will result in inferior welding effects between the electrode sheet 20 and the electrode tab 30, accordingly, the distance between two adjacent turns of the spiral weld mark 21 can be set to be 100 μm-500 μm.

In an embodiment, referring to FIG. 3, a plurality of the spiral weld marks 21 are arranged in an array, on a side of the electrode sheet 20. In specific implementation, the number of rows and columns in arrangement of the spiral weld marks 21 can be set based on actual needs, as long as the electrode sheet 20 and the electrode tab 30 can be welded firmly together, and the effect of electric power transmission between the electrode sheet 20 and the electrode tab 30 can be guaranteed to be better, no specific limitations are made herein.

In other embodiments, the arrangement of a plurality of the spiral weld marks 21 on a side of the electrode sheet 20 can also be adjusted based on actual needs, as long as the requirements of the present embodiment can be met, which will not be repeated herein.

In order to avoid a welding laser impacting the coating area of the electrode sheet 20 and affecting the active material layer of the electrode sheet 20 in a process of laser welding, the minimum distance between the spiral weld mark 21 and the coating area of the electrode sheet 20 configured in the present embodiment is greater than 1 mm, so that accident damage of the active material layer of the electrode sheet 20 can be avoided during the welding process, which helps to ensure that the quality of the battery is not affected.

In general, the empty foil area is located at the head or the tail of the current collector in the electrode sheet and, when the electrode tab 30 is welded to the empty foil area of the electrode sheet 20, the electrode tab 30 is located at the head or the tail of the electrode sheet 20; in order to guarantee the efficiency of electric power transmission between the electrode sheet 20 and the electrode tab 30, the empty foil area of the electrode sheet 20 can also be located in the middle of the electrode sheet 20, where a part of the active material layer in the middle of the electrode sheet 20 can be removed to form the empty foil area; for example, in a wound-type cell, the empty foil area can be arranged at the middle position of the electrode sheet of the wound-type cell along the length direction; for another example, in a laminated cell, the empty foil region can be extended outwards from the middle position of the electrode sheet of the laminated cell. In this case, when the electrode tab 30 is welded to the empty foil area of the electrode sheet 20, the electrode tab 30 can be located in the middle of the electrode sheet 20, so as to improve the efficiency of electric power transmission between the electrode tab 30 and the electrode sheet 20.

Specifically, in the present embodiment, after the laser welding, the height of the spiral convex portion 212 of the spiral weld mark 21 formed on the side of the electrode sheet 20 is within 30 μm; whereas in the prior art, after the ultrasonic welding, the height of the needle-shaped welding protrusion formed on the side of the electrode sheet 20 is above 80 μm. It can be seen that the height of the spiral convex portion 212 in the present embodiment is relatively low, and thus the battery separator between the positive electrode sheet and the negative electrode sheet is difficult to be pierced, thereby preventing short circuit from occurring and facilitating improving the quality and the safety performance of the battery.

In general, the battery separator located on the side of the electrode tab 30 is closer to the electrode tab 30; accordingly, a protrusion formed on the side of the electrode tab 30 may easily pierce the battery separator. However, the depth of the spiral concave portion 211 in the present embodiment is less than the sum of the thickness of the empty foil area of the electrode sheet 20 and that of the electrode tab 30, in other words, the spiral concave portion 211 of the spiral weld mark 21 does not form a protrusion on the side of the electrode tab 30, so that the short circuit caused by piercing the battery separator on the side of the electrode tab 30 can be avoided, thereby facilitating improving the quality and the safety performance of the battery.

Furthermore, the depth of the spiral concave portion 211 is 10 μm-80 μm. Generally, the thickness of the current collector of the electrode sheet is 5 μm-15 μm, and the thickness of the electrode tab is 30 μm-100 μm. In specific implementation, based on actual needs, the laser energy can be adjusted to cause the depth of the spiral concave portion 211 to be 10 μm-80 μm, as long as it can be ensured that the spiral concave portion 211 does not form a protrusion on the side of the electrode tab 30, or that the electrode sheet 20 and the electrode tab 30 are not welded through.

The diameter of the spiral weld mark 21 in the present embodiment is greater than 200 μm. In specific implementation, if the diameter of the spiral weld mark 21 is too small, on the one hand, it will result in relatively small number of turns of the spiral weld mark 21, and thus welding effects between the electrode sheet 20 and the electrode tab 30 will not be good; on the other hand, it will result in much close distance between two adjacent turns of the spiral weld mark 21, and thus the heat dissipation during the welding process will be inferior, affecting welding effects adversely.

The present embodiment further provides a preparation method of battery cell, including:

overlapping one end of an electrode tab with an empty foil area of an electrode sheet; causing a laser welding device to perform continuous welding on a surface of the empty foil area facing away from the electrode tab for several times, where each continuous welding performed by the laser welding device forms a spiral weld mark, and a plurality of the spiral weld marks are arranged at intervals; the spiral weld mark includes a spiral concave portion and a spiral convex portion located at the edge of the spiral concave portion; moreover, a surface of the electrode tab facing away from the empty foil area has no weld marks.

In specific implementation, the electrode sheet includes a positive electrode sheet and a negative electrode sheet, the electrode tab includes a positive electrode tab and a negative electrode tab. Firstly, the empty foil area of the positive electrode sheet can be attached to the positive electrode tab closely, for example, the empty foil area of the positive electrode sheet can be attached to the positive electrode tab closely by pressing down a clamping apparatus or attracting a clamping apparatus; afterwards, parameters of the laser welding device are set, for example, the time of each continuous welding performed by the laser welding device may be set to no more than 0.5 ms, etc., and the laser welding device may be caused to perform continuous welding to the positive electrode tab and the positive electrode sheet, on the side of the positive electrode sheet, for several times, where the total time of welding does not exceed 1 s, and thus a plurality of the spiral weld marks arranged at intervals will be formed on the surface of the positive electrode sheet; where each of the spiral weld marks includes the spiral concave portion and the spiral convex portion located at the edge of the spiral concave portion, and the surface of the electrode tab facing away from the empty foil area has no weld marks.

Similarly, the empty foil area of the negative electrode sheet can be attached to the negative electrode tab closely, and then the laser welding device is caused to perform impulse spot welding to the negative electrode tab and the negative electrode sheet, on the side of the negative electrode sheet, where the total time of welding does not exceed 1 s, and thus a plurality of the spiral weld marks arranged at intervals will be formed on the surface of the negative electrode sheet; where each of the spiral weld marks includes the spiral concave portion and the spiral convex portion located at the edge of the spiral concave portion, and the surface of the electrode tab facing away from the empty foil area has no weld marks.

Finally, the positive electrode sheet welded with the positive electrode tab, the negative electrode sheet welded with the negative electrode tab, and the battery separator are jointly processed to form the battery cell, such as a wound-type cell formed by winding or a laminated cell formed by stacking.

Within the battery cell in the present embodiment, after the electrode sheet and the electrode tab are welded together in a way of laser welding, as measured, a welding tension between the positive electrode sheet and the positive electrode tab is greater than 25N, and a welding tension between the negative electrode sheet and the negative electrode tab is greater than 8N; and, after breaking the electrode tab from the electrode sheet by continuing to apply tensile force, the area of the current collector of the electrode sheet remaining on the electrode tab accounts for more than 50% of that of the entire welding zone.

The process of measuring the welding tension between the electrode tab and the electrode sheet by using a tension gauge includes: at first, sticking the welding zone with an adhesive tape on the side of the electrode sheet; afterwards, using the upper part of the tension gauge to clamp the upper part of the electrode tab, and using the lower part of the tension gauge to clamp the lower part of aluminum foil and, at the same time, adjusting the tension display mode to a peak display mode, resetting the tension meter to zero and starting the measurement: pressing a "rise" button and pulling in 180° until the electrode tab and the electrode sheet are separated; finally, reading and recording the value displayed in the tension gauge and, at the same time, removing the electrode tab, and measuring the ratio of the area of the current collector of the electrode sheet remaining on the electrode tab to the total area of the welding zone.

Embodiment II

The present embodiment provides an electric device, where the electric device includes a battery.

The battery in the present embodiment has the same structure as the battery provided by Embodiment I, and can bring in the same or similar technical effects, which will not be repeated here one by one; for details, please refer to the description of the above embodiments.

In the description of the present disclosure, it should be understood that orientations or positional relations indicated by terms "top", "bottom", "upper", "lower" (if present), etc. are based on the orientations or positional relations shown in the drawings, they are merely to facilitate the description of the present disclosure and simplify the description, not intended to indicate or imply that the indicated device or element must have a specific orientation, and be constructed and operated in a specific orientation, thus, they cannot be understood as limitation to the present disclosure.

In the description of the present disclosure, it should be noted that, unless otherwise clearly specified and defined, terms "mounted", "connected with", "connected to" should be understood broadly, for example, they may be permanent connection, or demountable connection, or integral connection; they may be a mechanical connection or an electrical connection; they may be direct connection or indirect connection through an intermediate medium, or they may be internal communication between two components. For those skilled in the art, the specific meanings of the above terms in the present disclosure can be understood based on specific situations.

Terms "first" and "second" in the description, claims and the above-mentioned drawings of the present application are used to distinguish similar objects without having to describe a specific order or sequence. It should be appreciated that the data used in this way are interchangeable under appropriate circumstances so that the embodiments of the present application described herein, for example, can be implemented in an order other than those illustrated or described herein.

Finally, it should be noted that: the above embodiments are only used to describe the technical solutions of the present disclosure, and do not limit the same. Despite the present disclosure has been described in details referring to the above-mentioned embodiments, those skilled in the art should understand that modifications can still be made to the technical solutions described in the above-mentioned embodiments, or equivalent substitutions can be made to some or all of the technical features therein; and these modifications or substitutions will not make the essential of corresponding technical solutions depart from the scope of the technical solutions in the embodiments of the present disclosure.

What is claimed is:

1. A battery, comprising a housing and a battery cell accommodated in the housing, wherein
the battery cell comprises electrode sheets and electrode tabs, the electrode sheet comprises a current collector, and the current collector is coated with an active material layer, the current collector comprises a coating area coated with the active material layer and an empty foil area not coated with the active material layer, one end of the electrode tab is overlapped with the empty foil area, and the electrode tab and the electrode sheet are formed into an integral structure by laser welding;
a surface of the empty foil area facing away from the electrode tab has a plurality of spiral weld marks arranged at intervals, each of the spiral weld marks comprises a spiral concave portion and a spiral convex portion located at an edge of the spiral concave portion; and
a surface of the electrode tab facing away from the empty foil area has no weld marks.

2. The battery according to claim 1, wherein the number of turns of the spiral weld mark is greater than 1, a ratio of a distance between two adjacent turns of the spiral weld mark to a height of the spiral convex portion is not less than 3.

3. The battery according to claim 2, wherein the distance between two adjacent turns of the spiral weld mark is 100 µm-500 µm.

4. The battery according to claim 1, wherein the plurality of spiral weld marks are arranged in an array.

5. The battery according to claim 1, wherein a minimum distance between the spiral weld mark and the coating area is greater than 1 mm; and/or
the empty foil area is located in the middle of the electrode sheet.

6. The battery according to claim 1, wherein a height of the spiral convex portion is within 30 µm; and
a depth of the spiral concave portion is less than a sum of a thickness of the empty foil area and that of the electrode tab.

7. The battery according to claim 1, wherein a depth of the spiral concave portion is 10 μm-80 μm.

8. The battery according to claim 1, wherein a diameter of the spiral weld mark is greater than 200 μm.

9. A preparation method of battery, comprising:
overlapping one end of an electrode tab with an empty foil area of an electrode sheet;
causing a laser welding device to perform continuous welding on a surface of the empty foil area facing away from the electrode tab for several times, wherein each continuous welding performed by the laser welding device forms a spiral weld mark, and a plurality of the spiral weld marks are arranged at intervals; wherein the spiral weld mark comprises a spiral concave portion and a spiral convex portion located at an edge of the spiral concave portion; and wherein a surface of the electrode tab facing away from the empty foil area has no weld marks;
jointly processing the electrode sheet welded with the electrode tab and a battery separator to form a battery cell; and
assembling the battery cell into a housing to form a battery.

10. An electric device comprising a battery, wherein the battery comprises a housing and a battery cell accommodated in the housing, wherein
the battery cell comprises electrode sheets and electrode tabs, the electrode sheet comprises a current collector, and the current collector is coated with an active material layer, the current collector comprises a coating area coated with the active material layer and an empty foil area not coated with the active material layer, one end of the electrode tab is overlapped with the empty foil area, and the electrode tab and the electrode sheet are formed into an integral structure by laser welding;
a surface of the empty foil area facing away from the electrode tab has a plurality of spiral weld marks arranged at intervals, each of the spiral weld marks comprises a spiral concave portion and a spiral convex portion located at an edge of the spiral concave portion; and
a surface of the electrode tab facing away from the empty foil area has no weld marks.

11. The electric device according to claim 10, wherein the number of turns of the spiral weld mark is greater than 1, a ratio of a distance between two adjacent turns of the spiral weld mark to a height of the spiral convex portion is not less than 3.

12. The electric device according to claim 11, wherein the distance between two adjacent turns of the spiral weld mark is 100 μm-500 μm.

13. The electric device according to claim 10, wherein the plurality of spiral weld marks are arranged in an array.

14. The electric device according to claim 10, wherein a minimum distance between the spiral weld mark and the coating area is greater than 1 mm; and/or
the empty foil area is located in the middle of the electrode sheet.

15. The electric device according to claim 10, wherein a height of the spiral convex portion is within 30 μm; and
a depth of the spiral concave portion is less than a sum of a thickness of the empty foil area and that of the electrode tab.

16. The electric device according to claim 10, wherein a depth of the spiral concave portion is 10 μm-80 μm.

17. The electric device according to claim 10, wherein a diameter of the spiral weld mark is greater than 200 μm.

* * * * *